United States Patent
Crichton et al.

(10) Patent No.: US 8,526,677 B1
(45) Date of Patent: Sep. 3, 2013

(54) STEREOSCOPIC CAMERA WITH HAPTIC FEEDBACK FOR OBJECT AND LOCATION DETECTION

(75) Inventors: Daniel Mark Crichton, Eden Prairie, MN (US); Frances Haugen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/549,665

(22) Filed: Jul. 16, 2012

(51) Int. Cl.
*G06K 9/00* (2006.01)

(52) U.S. Cl.
USPC .......................................... 382/103; 382/154

(58) Field of Classification Search
USPC .................................................. 382/103, 154
See application file for complete search history.

(56) References Cited

U.S. PATENT DOCUMENTS

| | | | | |
|---|---|---|---|---|
| 6,502,032 | B1 * | 12/2002 | Newman | 701/487 |
| 2003/0108236 | A1 * | 6/2003 | Yoon | 382/154 |
| 2004/0022418 | A1 * | 2/2004 | Oota | 382/106 |
| 2006/0050014 | A1 * | 3/2006 | Yoon | 345/6 |
| 2008/0170118 | A1 | 7/2008 | Albertson et al. | |
| 2009/0234576 | A1 * | 9/2009 | Ou et al. | 701/201 |
| 2009/0315915 | A1 * | 12/2009 | Dunn et al. | 345/632 |
| 2011/0115885 | A1 * | 5/2011 | Wernersson | 348/47 |
| 2012/0019617 | A1 * | 1/2012 | Ahn et al. | 348/43 |
| 2012/0019624 | A1 * | 1/2012 | Park et al. | 348/47 |
| 2012/0038627 | A1 * | 2/2012 | Sung et al. | 345/419 |
| 2012/0166074 | A1 * | 6/2012 | Weng et al. | 701/409 |
| 2013/0004014 | A1 * | 1/2013 | Hickman | 382/100 |

* cited by examiner

*Primary Examiner* — Jingge Wu
(74) *Attorney, Agent, or Firm* — Troutman Sanders LLP; James E. Schutz; Mark Lehi Jones

(57) ABSTRACT

A mobile device includes a stereoscopic camera that generates 3D image data of a surrounding environment of the mobile device, a GPS module that determines a GPS location of the surrounding environment, a communication module that receives from a remote server a map of the surrounding environment based on the GPS location of the surrounding environment, and a processor. The processor determines a location of at least one object in the surrounding environment based on the 3D image data, compares the map of the surrounding environment with the location of the at least one object in the surrounding environment, and determines a current location of the mobile device on the map within the surrounding environment based on the comparison.

19 Claims, 15 Drawing Sheets

STEREOSCOPIC CAMERA WITH HAPTIC FEEDBACK FOR OBJECT AND LOCATION DETECTION

FIELD

The present disclosure generally relates to a system and technique for object and location detection and, more particularly, to a system and technique for object and location detection using a mobile electronic device with a stereoscopic camera that provides haptic feedback based on the object and location detection.

BACKGROUND

This section provides background information related to the present disclosure which is not necessarily prior art.

Visually impaired individuals need assistance navigating their environment and locating objects or obstacles in their environment, including objects or obstacles in their path of travel. For example, service animals, such as guide dogs, have been used to assist visually impaired individuals. Service animals, however, are expensive to train. Further, while service animals are able to assist in navigating an immediately surrounding area, service animals are unable to navigate to a specific remote location within a surrounding area, such as a building. Additionally, echo devices have been used to locate objects within an immediately surrounding area. Such echo devices are expensive and unable to provide the visually impaired individual with an exact position of a current location or with navigation assistance to a specific remote location within the surrounding area, such as a building.

Many mobile devices come equipped with GPS technology to determine a GPS location of the mobile device and provide a map overview of the general location of the mobile device. Such mobile devices, however, are not able to provide precise location data, or information about the locations of objects within an immediately surrounding area, that is necessary to assist a visually impaired user in navigating an environment and locating objects or obstacles in the environment, including objects or obstacles in a path of travel.

SUMMARY

This section provides a general summary of the disclosure, and is not a comprehensive disclosure of its full scope or all of its features.

In various embodiments of the present disclosure, a computer-implemented technique is disclosed. The technique includes generating, at a mobile device, 3D image data of a surrounding environment with a stereoscopic camera of the mobile device. The technique also includes determining, at the mobile device, a GPS location of the mobile device and receiving, at the mobile device, a map of the surrounding environment from a remote server based on the GPS location of the surrounding environment. The technique also includes determining, at the mobile device, a location of at least one object in the surrounding environment based on the 3D image data and comparing, at the mobile device, the map of the surrounding environment with the location of the at least one object in the surrounding environment. The technique also includes determining, at the mobile device, a current location of the mobile device on the map of the surrounding environment based on the comparing and generating, at the mobile device, output based on the current location of the mobile device.

In various embodiments of the present disclosure, a mobile device is disclosed. The mobile device includes a stereoscopic camera that generates 3D image data of a surrounding environment of the mobile device. The mobile device also includes a GPS module that determines a GPS location of the surrounding environment and a communication module that receives from a remote server a map of the surrounding environment based on the GPS location of the surrounding environment. The GPS module also includes a processor that determines a location of at least one object in the surrounding environment based on the 3D image data, that compares the map of the surrounding environment with the location of the at least one object in the surrounding environment, and that determines a current location of the mobile device on the map within the surrounding environment based on the comparison.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 15:
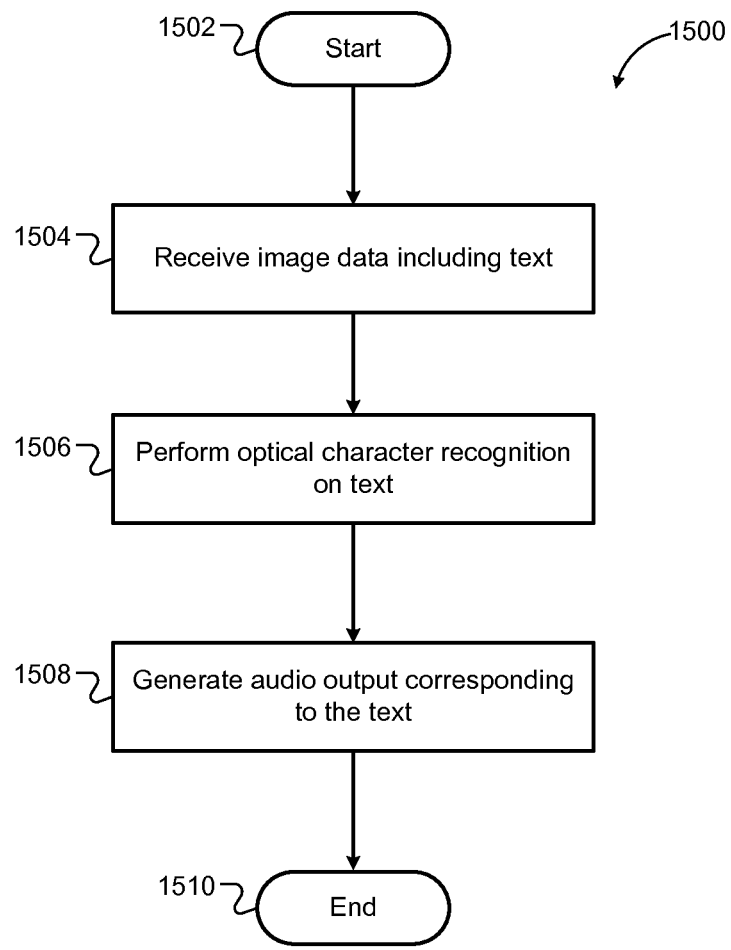

FIG. 15 a flow chart illustrating a technique of the present disclosure.

DETAILED DESCRIPTION

Example embodiments will now be described more fully with reference to the accompanying drawings.

Figure 1:
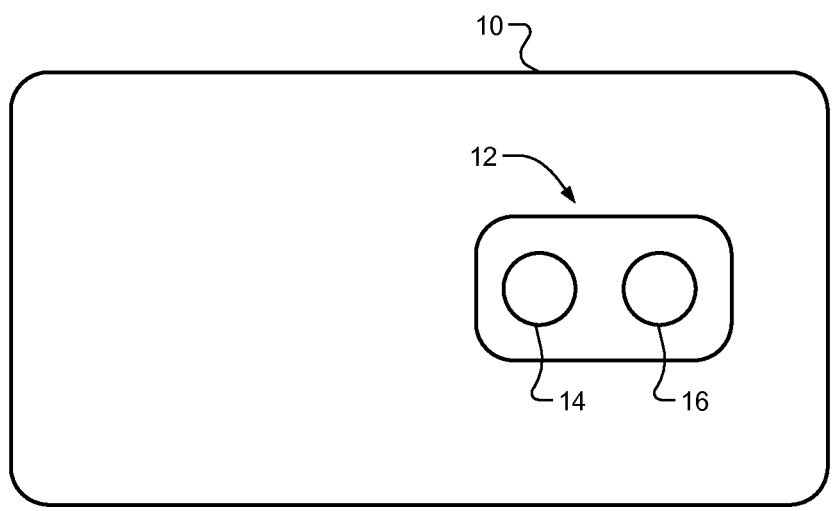
FIG. 1 illustrates an example mobile device with stereoscopic camera according to some embodiments of the present disclosure.

Referring now to FIG. 1, a mobile device 10 includes a stereoscopic camera 12, with two camera lenses 14, 16. The stereoscopic camera 12 uses the two camera lenses 14, 16 to capture 3D images of a surrounding environment and the objects located within the surrounding environment. For example, the stereoscopic camera 12 can generate a video stream of 3D image data of the surrounding environment. The mobile device 10 can use image analysis techniques, such as object recognition algorithms, edge and contour recognition algorithms, face recognition algorithms, and the like, to analyze the 3D image data of the surrounding environment to determine the location and shapes of objects within the surrounding environment. The mobile device 10 can include, for example, a mobile phone, a tablet computer, a personal digital assistance, or any other mobile electronic device configured with a stereoscopic camera 12.

Figure 2:
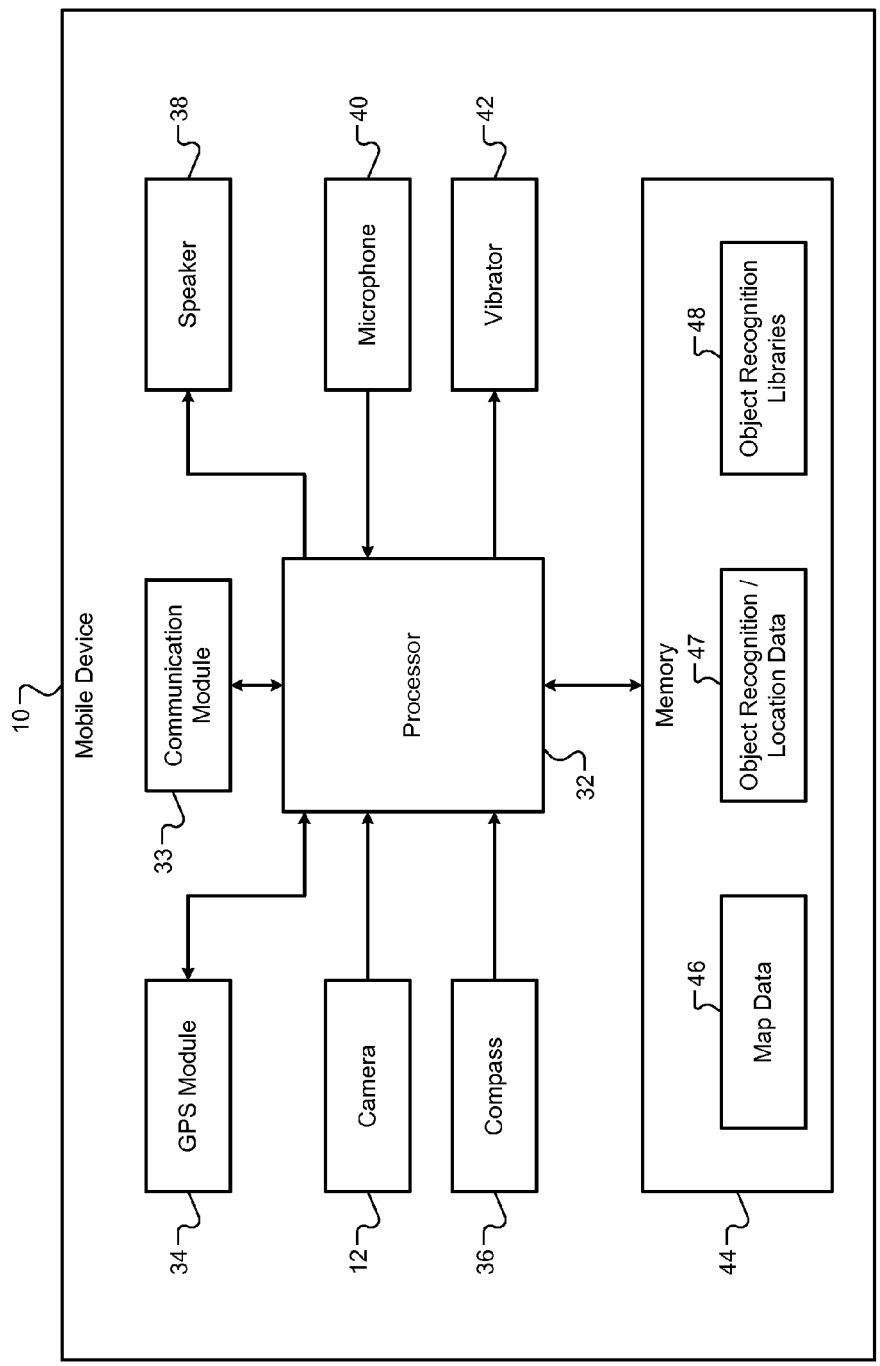
FIG. 2 is an example block diagram of the mobile device of FIG. 1.

An example mobile device 10 according to some embodiments of the present disclosure is shown in FIG. 2. The mobile device 10 includes the stereoscopic camera 12 in communication with a processor 32. The mobile device can also include a communication module 33, in communication with the processor 32, that communicates with various communication networks to request and receive data. The mobile device can also include a GPS module 34, a compass 36, a speaker 38, a microphone 40, and a vibrator 42, each in communication with the processor 32.

The mobile device 10 can include a memory 44 that stores map data 46, object recognition/location data 47, and object recognition libraries 48. As discussed above, the stereoscopic camera 12 generates 3D image data of the surrounding environment of the mobile device 10. The processor 32 uses image analysis techniques, such as object recognition algorithms, edge and contour recognition algorithms, face recognition algorithms, and the like, to analyze the 3D image data of the surrounding environment to determine the location and shapes of objects within the surrounding environment. The object recognition libraries 48 can store, for example, various image patterns and shapes and object characteristics. The processor 32 can analyze the 3D image data of the surrounding environment, using the various image patterns and shapes and object characteristics stored in the object recognition libraries 48 to determine the location and shapes of objects within the surrounding environment of the mobile device 10.

Figure 3:
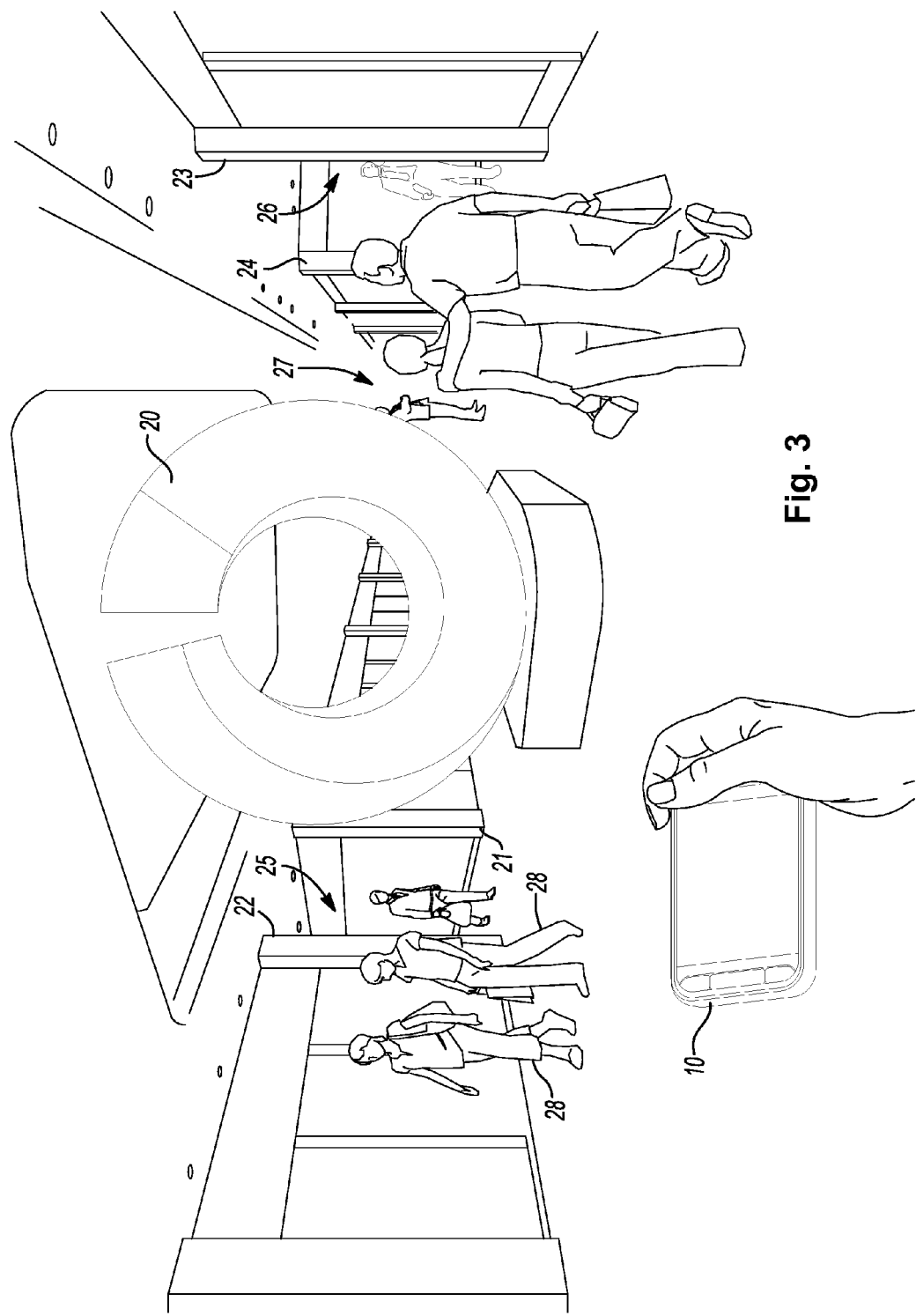
FIG. 3 illustrates the mobile device of FIG. 1 in a surrounding environment.

As depicted in the example of FIG. 3, the mobile device 10 is shown in a surrounding environment of an interior of a building, being held by a hand of user. The stereoscopic camera 12 (which, in this example, is located on the back side of the mobile device 10 and not shown in FIG. 3) can generate 3D image data of the surrounding environment. The processor 32 can analyze the 3D image data of the surrounding environment, using the object recognition libraries 48, to recognize and detect the location and shapes of various objects within the surrounding environment. For example, the processor 32 can recognize, detect, and locate various persons 28, as well as the statue object 20, which is located in the middle of a four-way pedestrian intersection of the interior of the building. Further, the processor 32 can recognize, detect, and locate the corner pillars 21, 22, 23, 24 of the four-way pedestrian intersection. The processor 32 can estimate distances to the detected objects within the surrounding environment. Further, the processor 32 can distinguish between the moving objects detected in the surrounding environment, such as the various persons 28, and the non-moving objects that are features of the interior of the building, such as the statue object 20 and the corner pillars 21, 22, 23, 24.

With reference again to FIG. 2, the GPS module 34 may determine a GPS location of the mobile device 10. For example, the GPS module 34 may determine longitude, latitude, and altitude coordinates of the location of the mobile device 10.

Figure 4:
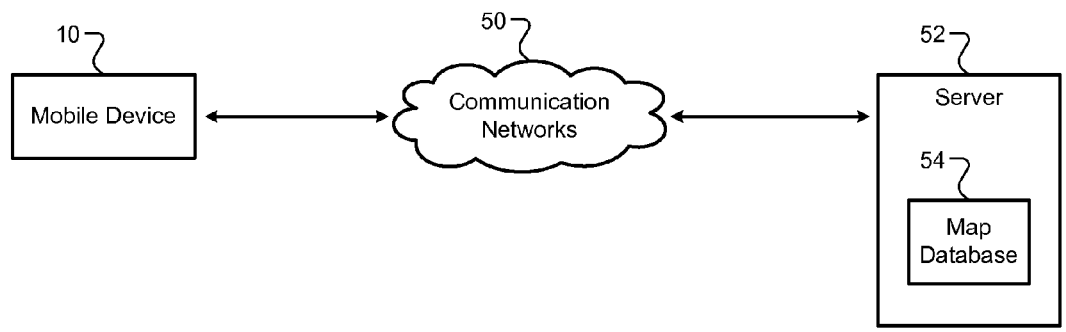
FIG. 4 is a block diagram of the mobile device of FIG. 1 in communication with a server according to some embodiments of the present disclosure.

With reference to FIG. 4, the mobile device 10 can send the GPS location of the mobile device 10, as determined by the GPS module 34, to a server 52 as part of a request for map data specific to the GPS location. For example, the server 52 may include a computing device operating as a database server, a file server, and/or a web server that receives and responds to client requests from client computing devices, such as the mobile device 10. The mobile device 10 can use the communication module 33 (shown in FIG. 2) to communicate through communication networks 50 with server 52. The server 52 can receive the GPS location of the mobile device 10 and query a map database 54 accessible to the server 52 to determine whether the server 52 has a detailed map corresponding to the GPS location of the mobile device 10.

For example, the GPS location of the mobile device 10 may correspond to a particular building, such as a particular shopping mall. The server 52 may receive the GPS location of the mobile device and retrieve a detailed map of the interior of the building, such as the particular shopping mall, from the map database 54. The server 52 can then send the detailed map of the interior of the building back to the mobile device 10, through the communication networks 50, in response to the original request from the mobile device 10.

Figure 5:
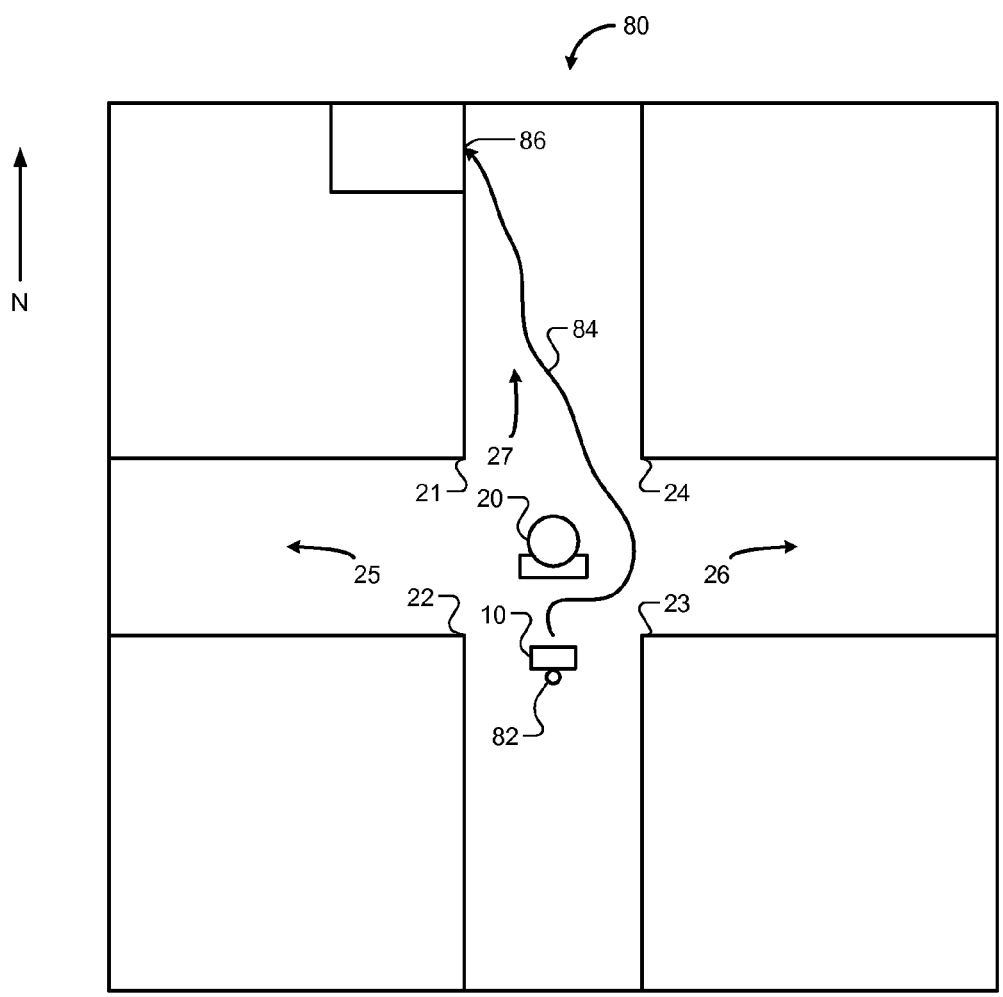
FIG. 5 illustrates a detailed map of a surrounding environment with the mobile device of FIG. 1 located therein.

As depicted in FIG. 5, a detailed map 80 can include various features of the interior of the building, such as the statue object 20 and the corner pillars 21, 22, 23, 24, also shown in FIG. 3. Once the mobile device 10 receives the detailed map 80 from the server 52, the processor 32 can store the detailed map 80 in memory 44 as map data 46.

The processor 32 can then compare the locations and shapes of the various objects detected and located within the surrounding environment, as determined from analysis of the 3D image data from the stereoscopic camera 12, with the detailed map 80 stored as map data 46 to determine a precise current location of the mobile device 10 on the detailed map 80 within the surrounding environment. For example, the processor 32 can match the statue object 20 (FIG. 3), as determined from the 3D image data, with the statue object 20 of the detailed map 80 (FIG. 5) and match the corner pillars 21, 22, 23, 24 of the four-way pedestrian intersection (FIG. 3), as determined from the 3D image data, with the corner pillars 21, 22, 23, 24 of the detailed map 80 (FIG. 5) to determine a precise current location 82 (FIG. 5) of the mobile device 10 on the detailed map 80 within the surrounding environment.

Additionally, the processor 32 can receive directional data corresponding to a present facing direction of the mobile device 10 from a compass 36 (FIG. 2). The processor 32 can use the directional data to further assist in determining a precise current location 82 (FIG. 5) of the mobile device. For example, the processor 32 can use the directional data from the compass 36 to determine that the mobile device 10 is located south of the statue object 20 and the corner pillars 21, 22, 23, 24 of the four-way pedestrian intersection shown in FIG. 3 and FIG. 5.

Figure 6:
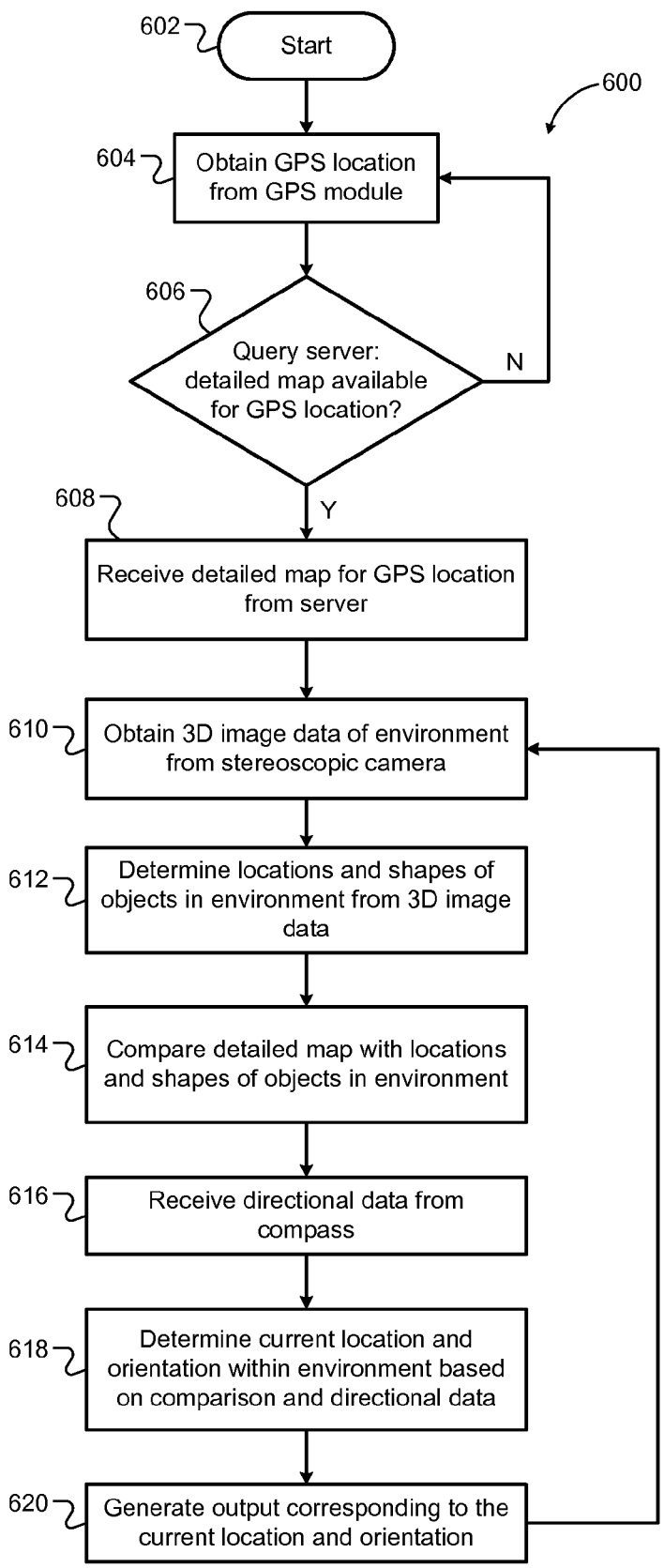
FIG. 6 is a flow chart illustrating a technique of the present disclosure.

An example technique or computer-implemented method 600 that can be executed by the processor 32 of the mobile device 10 for achieving the above functionality is shown in FIG. 6. In FIG. 6, the technique begins at 602. At 604, the processor 32 obtains a current GPS location of the mobile device 10 from the GPS module 34. At 606, the processor 32 sends a request, through the communication module 33 and the communication networks 50, to the server 52 requesting a detailed map corresponding to the GPS location. When a detailed map is not available for the current GPS location of the mobile device 10, the server 52 can respond to the processor 32 of the mobile device 10 indicating that a detailed map is not available. In such case, the technique can then return to 604.

At 608, when a detailed map is available for the current GPS location of the mobile device 10, the server 52 can send the detailed map to the processor 32 and the processor 32 can receive the detailed map from the server 52 and store the detailed map in memory 44 as map data 46.

At 610, the processor 32 can obtain 3D image data of the surrounding environment from the stereoscopic camera 12. At 612, processor 32 can determine the locations and shapes of objects in the surrounding environment from the 3D image data, using the object recognition libraries 48, as described above.

At 614, the processor 32 can compare the detailed map, received from the server 52, with the locations and shapes of objects in the surrounding environment. At 616, the processor 32 can receive directional data from the compass 36.

At 618, the processor 32 can determine a precise current location of the mobile device 10, and orientation of the mobile device 10, within the surrounding environment based on the comparison of the detailed map, received from the server 52, with the locations and shapes of objects in the surrounding environment, as determined from the 3D image data, and based on the directional data received from the compass 36.

At 620, the processor 32 can generate output corresponding to the current location and orientation of the mobile device 10. For example, the processor 32 can use a speaker 38 (FIG. 2) to produce audio output indicating the current location and orientation of the mobile device. For example, the processor 32 can produce audible voice output stating that: "You are at shopping mall X, located south of a four-way pedestrian intersection in front of a statue."

Once a precise current location of the mobile device 10 has been determined, the processor 32 can receive input corresponding to a desired destination location. For example, processor 32 can receive audio input through the microphone 40 (FIG. 2) indicating a destination location within the surrounding environment. The processor 32 can use the present current location, the desired destination location, and the map data 46 to determine a route and navigation instructions to the destination location.

Figure 7:
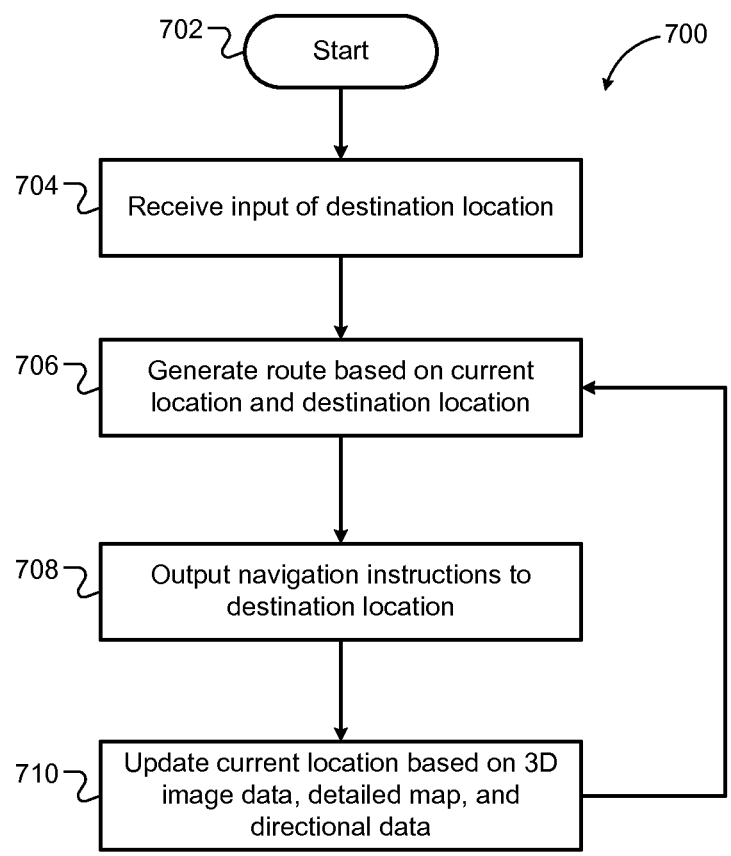
FIG. 7 is a flow chart illustrating a technique of the present disclosure.

An example technique or computer-implemented method 700, that can be executed by the processor 32 of the mobile device 10 for achieving the above functionality is shown in FIG. 7. In FIG. 7, the technique begins at 702. At 704, the processor 32 receives input of a destination location via the microphone 40 (FIG. 2). At 706, the processor 32 generates a route based on the current location of the mobile device 10 and the inputted destination location and based on the map data 46 (FIG. 2). At 708, the processor 32 outputs the navigation instructions to the destination location. For example, the navigation instructions may be audio instructions outputted to the user through the speaker 38 (FIG. 2). For example, the outputted audio instructions may include turn-by-turn audio instructions, such as: "proceed forward for 10 feet;" "proceed forward for 10 steps;" "turn right in 10 feet;" "turn right in 10 steps;" and the like.

At 710, the processor 32 can update the current location based on the 3D image data, the map data 46, and the directional data, and then return to 706 to generate an updated route based on the updated current location, the destination location, and the map data 46.

With reference again to FIG. 5, a current location 82 of the mobile device 10 is shown, along with a destination location 86. An example navigation route 84 is shown from the current location 82 of the mobile device 10 to the destination location 86. As shown in FIG. 5, the navigation route 84 navigates the user around the statue object 20 and to the destination location 86.

According to some embodiments of the present disclosure, the mobile device 10 may provide haptic feedback corresponding to a distance from the mobile device 10 to an object within view of the mobile device 10. For example, a user may pan the mobile device 10 in a left-to-right and/or right-to-left motion and receive haptic feedback as objects come in and out of view of the stereoscopic camera 12 of the mobile device 10.

Figure 8C:
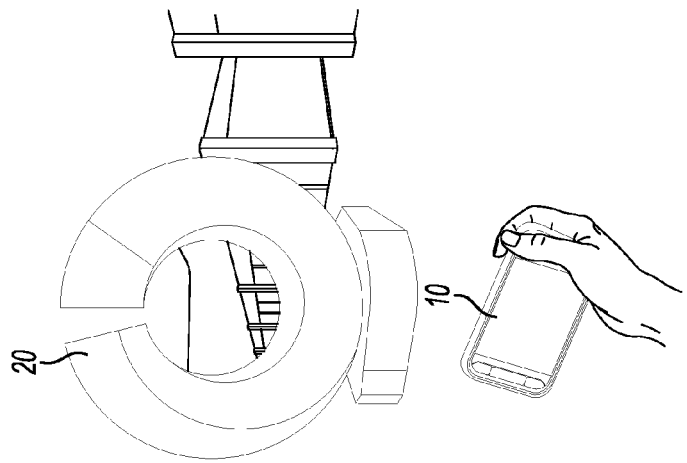
FIG. 8c illustrates the mobile device of FIG. 1 near a statue object in a surrounding environment.
Figure 8B:
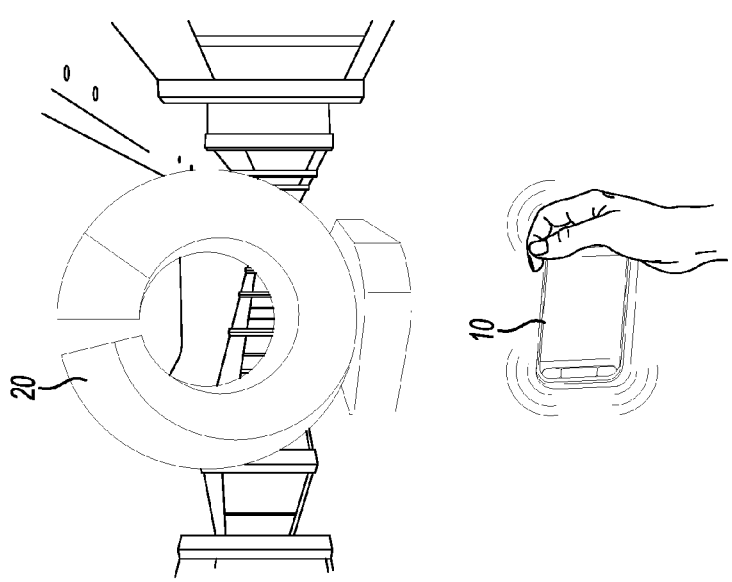
FIG. 8b illustrates the mobile device of FIG. 1 near a statue object in a surrounding environment.
Figure 8A:
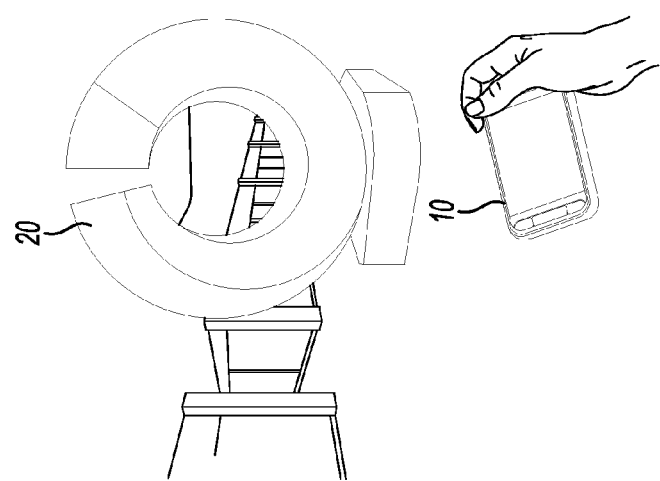
FIG. 8a illustrates the mobile device of FIG. 1 near a statue object in a surrounding environment.

As shown in FIGS. 8A, 8B, and 8C, the mobile device 10 is depicted as being panned in a left-to-right manner proceeding, in sequence, from FIG. 8A to FIG. 8B to FIG. 8C. In FIG. 8A, there are no objects within the immediate view of the stereoscopic camera 12 of the mobile device. In FIG. 8B, the statue object 20 is within immediate view of the stereoscopic camera 12 of the mobile device 10, and, as shown, the mobile device 10 provides haptic feedback to the user in the form of vibration output. The mobile device 10 can actuate the vibrator (FIG. 2) to provide haptic feedback to the user. In FIG. 8C, the statue object 20 is no longer within immediate view and the haptic feedback, or vibration output, of the mobile device 10 subsides. The processor 32 may vary the intensity of the haptic feedback, or vibration output, to correspond to an estimated distance of the mobile device 10 to the object within immediate view.

Figure 9:
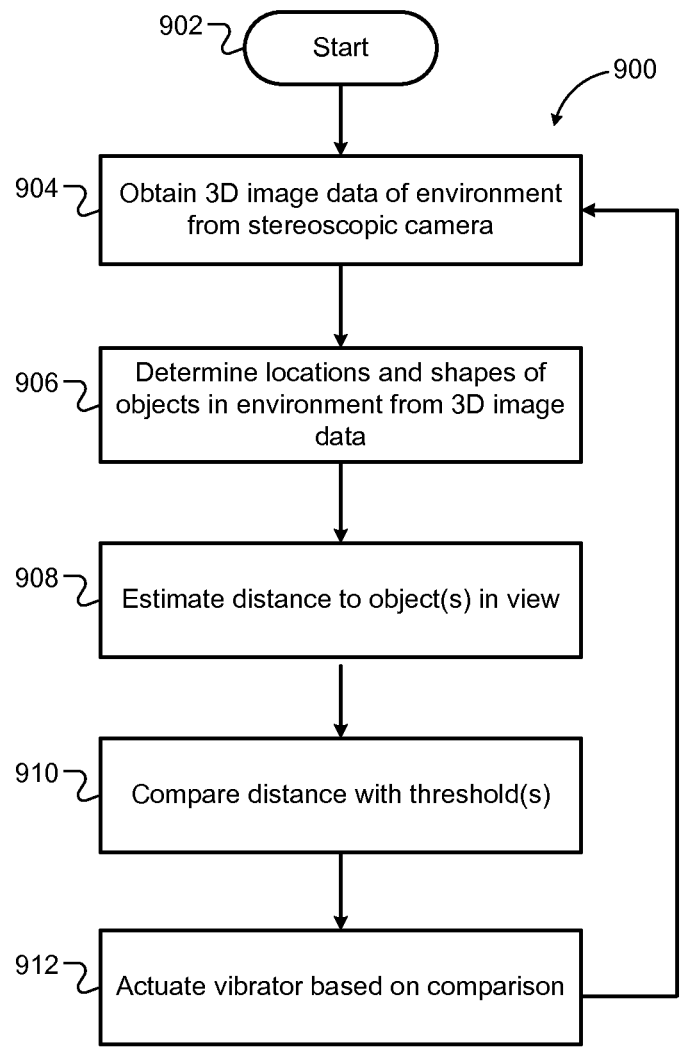
FIG. 9 is a flow chart illustrating a technique of the present disclosure.

An example technique or computer-implemented method 900, that can be executed by the processor 32 of the mobile device 10 for achieving the above functionality is shown in FIG. 9. In FIG. 9, the technique begins at 902. At 904, the processor 32 receives 3D image data of the surrounding environment from the stereoscopic camera 12. At 906, the processor 32 determines the locations and shapes of objects in the surrounding environment from the 3D image data, as described above. At 908, the processor 32 estimates the distance from the mobile device to the object or objects in immediate view. At 910, the processor 32 compares the estimated distance with one or more thresholds. For example, the thresholds may include one or more of a one-meter threshold, a three-meter threshold, and/or a five-meter threshold. At 912, the processor 32 actuates the vibrator 42 based on the comparison. For example, the processor 32 can vary the vibration intensity based on the distance from the mobile device 10 to the object in view. For example, the processor 32 can actuate the vibrator 42 with high intensity when the estimated distance is less than the one-meter threshold, with medium intensity when the estimated distance is between the one-meter threshold and the three-meter threshold, and with low intensity when the estimated distance is between the three-meter threshold and the five-meter threshold. When the estimated distance is greater than the five-meter threshold, the processor 32 may stop or refrain from actuating the vibrator. In this way, the processor 32 can actuate the vibrator 42 with high intensity when objects in view are relatively close to the mobile device 10 and can actuate the vibrator 42 with less intensity when objects in view are relatively farther away from the mobile device 10.

Figure 10:
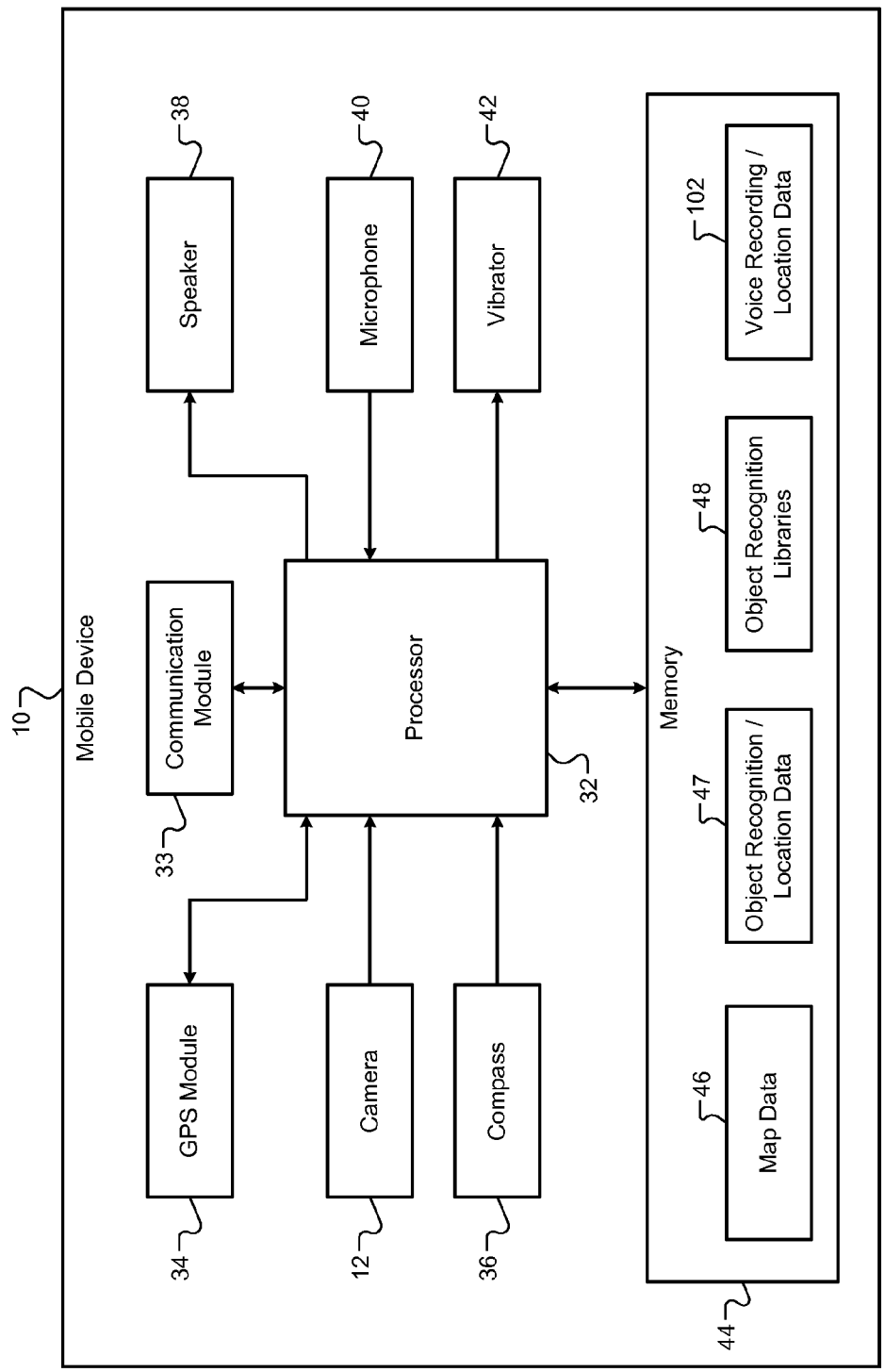
FIG. 10 is an example block diagram of the mobile device of FIG. 1.

Another example mobile device 10 according to some embodiments of the present disclosure is shown in FIG. 10. The mobile device 10 depicted in FIG. 10 is identical to the mobile device 10 depicted in FIG. 2, except that the mobile device of FIG. 10 includes voice recording/location data 102 in the memory 44. A user can input voice annotation data into the microphone 40 of the mobile device 10. The processor 32 can store the voice annotation data in the memory 44 along with corresponding location data. In this way, a user can provide voice recording annotations to correspond with particular locations within the surrounding environment. When the user is again at that same location, the mobile device 10 can playback the previously recorded voice annotation data.

Figure 11:
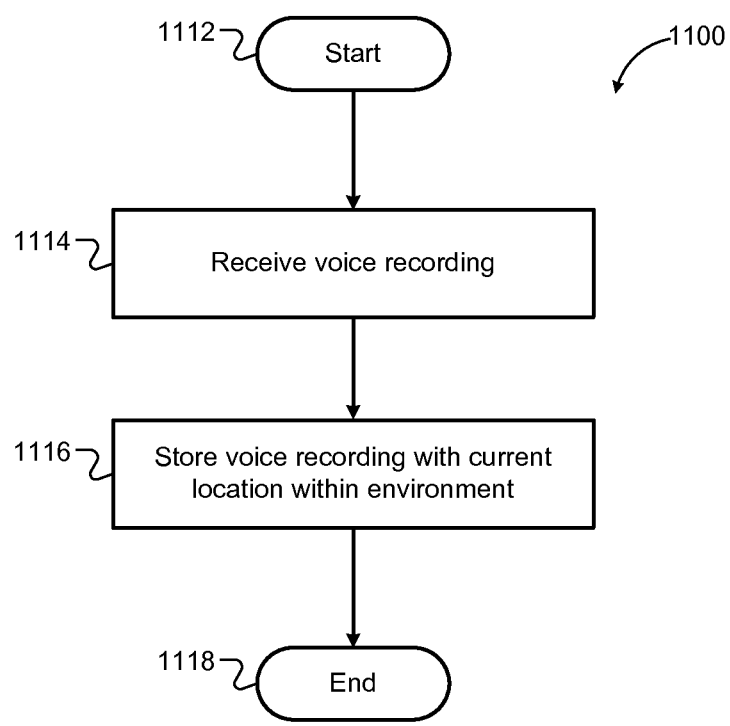
FIG. 11 is a flow chart illustrating a technique of the present disclosure.

An example technique or computer-implemented method 1100, that can be executed by the processor 32 of the mobile device 10 for achieving the above functionality is shown in FIG. 11. In FIG. 11, the technique begins at 1112. At 1114, the processor 32 receives voice recording data via the microphone 40 (FIG. 10). At 1116, the processor 32 stores the voice recording data in memory 44 along with the current location of the mobile device 10 within the surrounding environment. At 1118, the technique ends.

Figure 12:
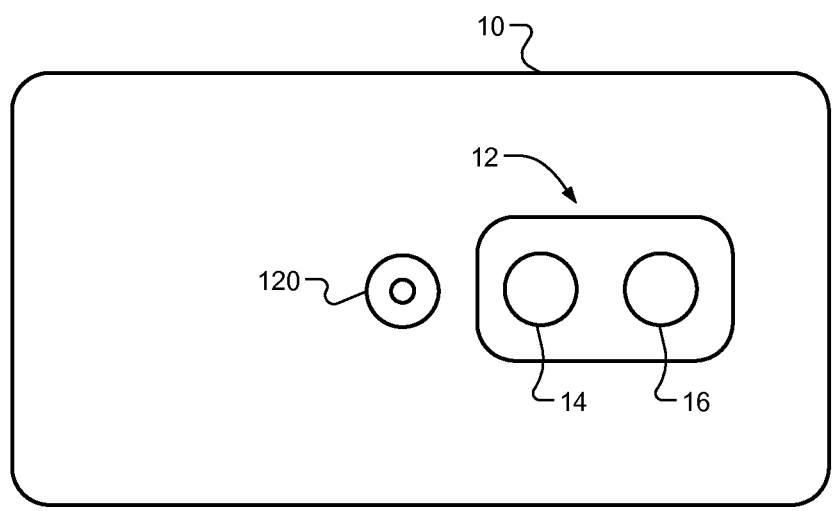
FIG. 12 illustrates an example mobile device with stereoscopic camera and infrared sensor according to some embodiments of the present disclosure.
Figure 13:
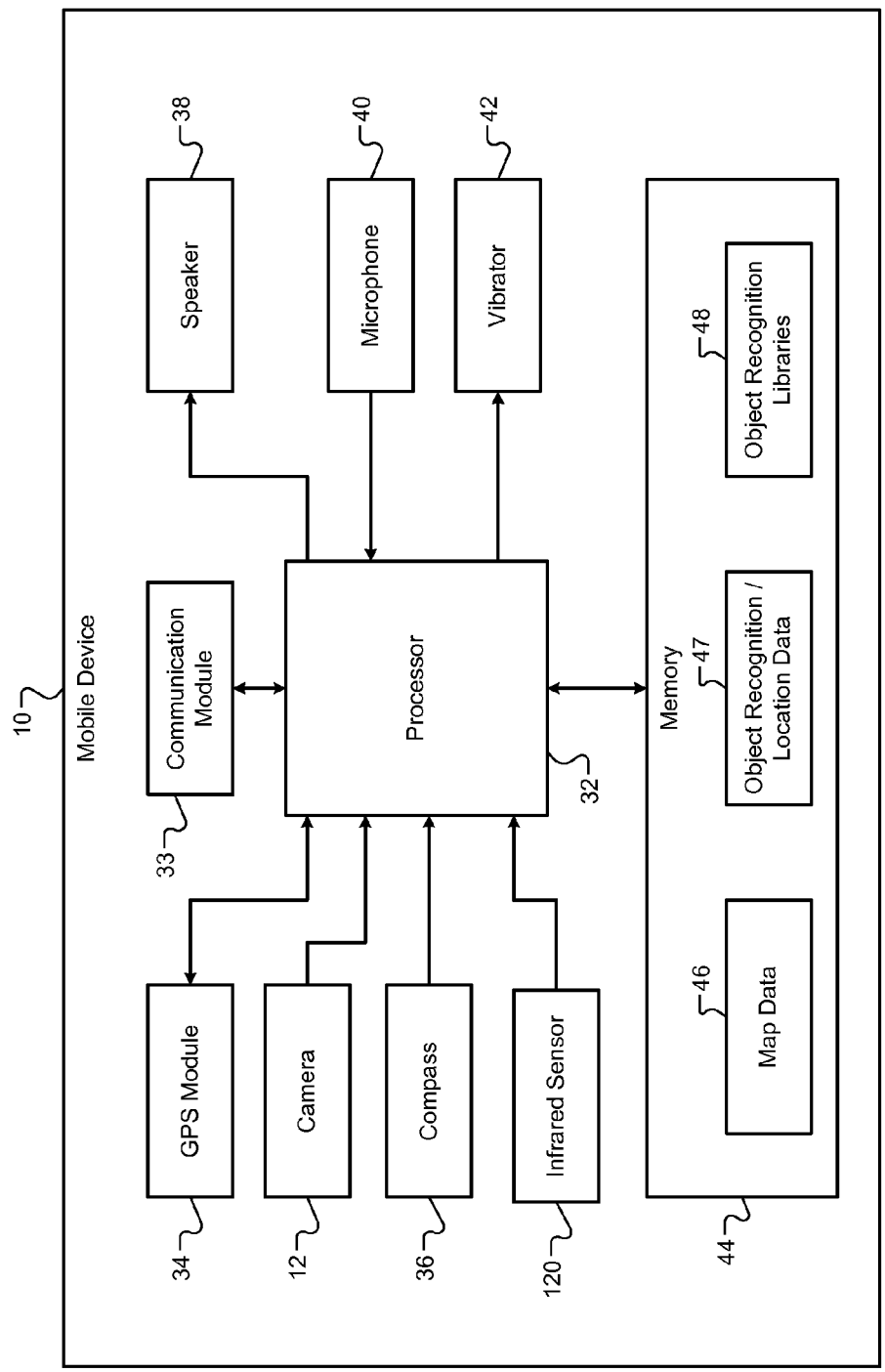
FIG. 13 is a block diagram of the mobile device of FIG. 12.

Another example mobile device 10 according to some embodiments of the present disclosure is shown in FIG. 12 and FIG. 13. The mobile device 10 depicted in FIG. 12 is identical to the mobile device 10 depicted in FIG. 1, except that the mobile device 10 depicted in FIG. 12 has an infrared sensor 120, in addition to the stereoscopic camera 12, with camera lenses 14, 16. Likewise, the mobile device 10 depicted in FIG. 13 is identical to the mobile device 10 depicted in FIG. 2, except that the mobile device 10 depicted in FIG. 13 includes infrared sensor 120. The processor 32 can use infrared data received from infrared sensor 120 in place of, or in addition to, the 3D image data received from the stereoscopic camera 12 to determine the locations and shapes of objects in the surrounding environment. In this way, the mobile device 10 can be used in dark or low-light environments.

Figure 14:
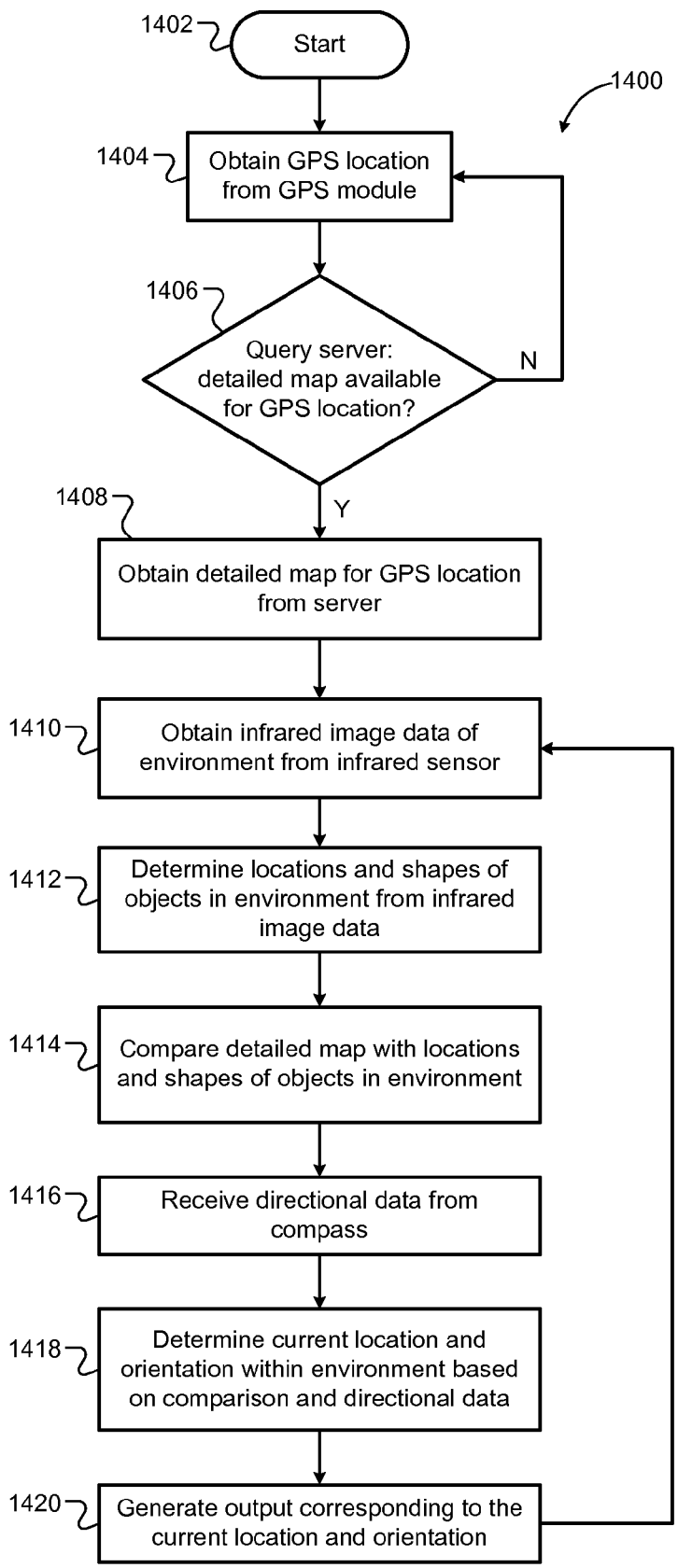
FIG. 14 is a flow chart illustrating a technique of the present disclosure.

An example technique or computer-implemented method 1400, that can be executed by the processor 32 of the mobile device 10 for achieving the above functionality is shown in FIG. 14. In FIG. 14, the technique begins at 1402. At 1404, the processor 32 obtains a current GPS location of the mobile device 10 from the GPS module 34. At 1406, the processor 32 sends a request, through the communication module 33 and the communication networks 50, to the server 52 requesting a detailed map corresponding to the GPS location. When a detailed map is not available for the current GPS location of the mobile device 10, the server 52 can respond to the processor 32 of the mobile device 10 indicating that a detailed map is not available. In such case, the technique may then return to 1404.

At 1408, when a detailed map is available for the current GPS location of the mobile device 10, the server 52 may send the detailed map to the processor 32 and the processor 32 may receive the detailed map from the server 52 and store the detailed map in memory 44 as map data 46.

At 1410, the processor 32 can obtain infrared image data of the surrounding environment from the infrared sensor 120. At 1412, processor 32 can determine the locations and shapes of objects in the surrounding environment from the infrared image data, using the object recognition libraries 48, as described above.

At 1414, the processor 32 can compare the detailed map, received from the server 52, with the locations and shapes of objects in the surrounding environment. At 1416, the processor 32 can receive directional data from the compass 36.

At 1418, the processor 32 can determine a precise current location of the mobile device 10, and orientation of the mobile device 10, within the surrounding environment based on the comparison of the detailed map, received from the server 52, with the locations and shapes of objects in the surrounding environment, as determined from the infrared image data, and based on the directional data received from the compass 36.

At 1420, the processor 32 can generate output corresponding to the current location and orientation of the mobile device 10. For example, the processor 32 can use a speaker 38 (FIG. 2) to produce audio output indicating the current location and orientation of the mobile device.

In processing image data received from the stereoscopic camera 12, the processor 32 can recognize text that appears in the 3D image data using optical character recognition techniques. In this way, the mobile device can recognize, and produce audio output with speaker 38, corresponding to recognized text in the 3D image data, such as storefront signs, street signs, and the like.

An example technique or computer-implemented method 1500, that can be executed by the processor 32 of the mobile device 10 for achieving the above functionality is shown in FIG. 15. In FIG. 15, the technique begins at 1502. At 1504, the processor 32 receives image data that includes text. At 1506, the processor 32 performs optical character recognition on the text within the image data. At 1508, the processor 32 generates audio output using speaker 38 (FIG. 2) corresponding to the text. At 1510, the technique ends.

In various embodiments of the present disclosure, the techniques described herein may be implemented by one or more computer programs executed by one or more processors. The computer programs can, for example, be implemented as a portion of a stand-alone application or as an application programming interface (API) running on the processor of the mobile device 10.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, bytecode and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer-readable medium. The computer programs may also include stored data. Non-limiting examples of the non-transitory tangible computer-readable medium are devices including non-volatile memory, magnetic storage devices, and optical storage devices.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer-readable medium that can be accessed by the computer. Such a computer program may be stored in a tangible computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
generating, at a mobile device, three-dimensional (3D) image data of a surrounding environment with a stereoscopic camera of the mobile device;
determining, at the mobile device, a global positioning system (GPS) location of the mobile device;
receiving, at the mobile device, a map of the surrounding environment from a remote server based on the GPS location of the mobile device;
determining, at the mobile device, a location of at least one object in the surrounding environment based on the 3D image data;

determining, at the mobile device, a distance to the at least one object;

generating, at the mobile device, haptic feedback including a vibration intensity corresponding to the determined distance from the mobile device to the at least one object;

comparing, at the mobile device, the map of the surrounding environment with the location of the at least one object in the surrounding environment;

determining, at the mobile device, a current location of the mobile device on the map of the surrounding environment based on the comparing;

receiving, at the mobile device, a voice recording annotation from a user, the voice recording annotation corresponding to the current location within the surrounding environment;

storing, at a memory of the mobile device, the voice recording annotation; and generating, at the mobile device, output based on the current location of the mobile device.

2. The computer-implemented method of claim 1, further comprising:

determining, at the mobile device, a distance to the at least one object; and generating, at the mobile device, audio output based on the distance to the at least one object.

3. The computer-implemented method of claim 1, wherein the map of the surrounding environment comprises a map of an interior of a building.

4. The computer-implemented method of claim 1, further comprising:

receiving, at the mobile device, a destination location within the surrounding environment;

generating, at the mobile device, navigation instructions for travel from the current location to the destination location; and generating, at the mobile device, output corresponding to the navigation instructions.

5. The computer-implemented method of claim 1, further comprising:

receiving, at the mobile device, directional data from a compass of the mobile device;

determining, at the mobile device, an orientation of the mobile device within the surrounding environment based on the directional data; and determining, at the mobile device, the current location of the mobile device on the map of the surrounding environment based on the orientation of the mobile device.

6. The computer-implemented method of claim 5, further comprising:

receiving, at the mobile device, a destination location;

generating, at the mobile device, navigation instructions to travel from the current location to the destination location based on the current location of the mobile device and the orientation of the mobile device within the surrounding environment; and generating, at the mobile device, output corresponding to the navigation instructions.

7. The computer-implemented method of claim 1, further comprising:

receiving, at the mobile device, infrared data corresponding to the at least one object from an infrared sensor of the mobile device;

determining, at the mobile device, a distance to the at least one object based on the infrared data; and generating, at the mobile device, at least one of audio output and haptic feedback based on the distance to the at least one object.

8. The computer-implemented method of claim 1, further comprising:

recognizing, at the mobile device, text within the 3D image data of the surrounding environment; and generating, at the mobile device, audio output corresponding to the recognized text.

9. A mobile device comprising:

a stereoscopic camera that generates three-dimensional (3D) image data of a surrounding environment of the mobile device;

a global positioning system (GPS) module that determines a GPS location of the surrounding environment;

a communication module that receives from a remote server a map of the surrounding environment based on the GPS location of the surrounding environment;

a processor that determines a location of at least one object in the surrounding environment based on the 3D image data, that determines a distance to the at least one object, that generates haptic feedback including a vibration intensity corresponding to the determined distance from the mobile device to the at least one object, that compares the map of the surrounding environment with the location of the at least one object in the surrounding environment, and that determines a current location of the mobile device on the map within the surrounding environment based on the comparison;

a microphone that receives a voice recording annotation from a user, the voice recording annotation corresponding to the current location within the surrounding environment; and a memory that stores the voice recording annotation.

10. The mobile device of claim 9, further comprising a vibrator, wherein the processor determines a distance to the at least one object and generates haptic feedback with the vibrator based on the distance to the at least one object.

11. The mobile device of claim 9, further comprising a speaker, wherein the processor determines a distance to the at least one object and generates audio output with the speaker based on the distance to the at least one object.

12. The mobile device of claim 9, wherein the map of the surrounding environment comprises a map of an interior of a building.

13. The mobile device of claim 9, further comprising a user-input device that receives user-input of a destination location within the surrounding environment, wherein the processor generates navigation instructions for travel from the current location to the destination location, and generates output corresponding to the navigation instructions.

14. The mobile device of claim 9, further comprising a compass that generates directional data, wherein the processor determines an orientation of the mobile device within the surrounding environment based on the directional data and determines the current location of the mobile device on the map within the surrounding environment based on the orientation of the mobile device.

15. The mobile device of claim 14, further comprising a user-input device that receives user-input of a destination location within the surrounding environment, wherein the processor generates navigation instructions for travel to the destination location based on the current location of the mobile device and based on the orientation of the mobile device within the surrounding environment, and generates output corresponding to the navigation instructions.

16. The mobile device of claim 9, further comprising an infrared sensor that generates infrared data corresponding to the at least one object, and at least one of a vibrator and a speaker, wherein the processor determines a distance to the at least one object based on the infrared sensor and generates at least one of haptic feedback with the vibrator and audio output with the speaker based on the distance to the at least one object.

17. The mobile device of claim 9, further comprising a speaker, wherein the processor recognizes text within the 3D image data of the surrounding environment and generates audio output corresponding to the recognized text.

18. The computer-implemented method of claim 1, further comprising generating, at the mobile device, audio output including the voice recording annotation when the mobile device is at the current location during a future period of time.

19. The mobile device of claim 9, further comprising a speaker that generates audio output including the voice recording annotation when the mobile device at the current location during a future period of time.

* * * * *